United States Patent [19]

Kobayashi et al.

[11] Patent Number: 4,606,236
[45] Date of Patent: Aug. 19, 1986

[54] SYNCHRONIZER IN A TRANSMISSION FOR A MOTOR VEHICLE

[75] Inventors: Toshio Kobayashi, Tokyo; Shinichirou Mura, Mitaka, both of Japan

[73] Assignee: Fuji Jukogyo Kabushiki Kaisha, Tokyo, Japan

[21] Appl. No.: 747,506

[22] Filed: Jun. 21, 1985

[51] Int. Cl.4 .............................................. F16H 3/38
[52] U.S. Cl. ...................................... 74/339; 74/363; 192/53 R
[58] Field of Search ................. 74/339, 340, 363, 355, 74/369; 192/53 R, 53 F

[56] References Cited

U.S. PATENT DOCUMENTS

| 1,853,988 | 4/1932 | Murray | 74/339 |
|---|---|---|---|
| 2,864,476 | 12/1958 | Ashauer et al. | 192/53 F |
| 3,631,952 | 1/1972 | Sugimoto et al. | 192/53 F |
| 4,132,122 | 2/1979 | Richards | 192/53 F |
| 4,307,624 | 12/1981 | Mylenek | 74/477 |
| 4,360,094 | 11/1982 | Ikemoto et al. | 74/339 |
| 4,377,093 | 3/1983 | Janson | 74/477 |

FOREIGN PATENT DOCUMENTS

| 0100428 | 7/1980 | Japan | 192/53 F |
|---|---|---|---|
| 5740729 | 8/1980 | Japan . | |
| 0605097 | 7/1948 | United Kingdom | 192/53 F |

Primary Examiner—Lawrence Staab
Assistant Examiner—Martin G. Belisario
Attorney, Agent, or Firm—Martin A. Farber

[57] ABSTRACT

A synchronizer is the type which has a hub having a boss at a central portion thereof, a sleeve axially slidably engaged with the hub with splines, synchronizer keys provided between the hub and the sleeve, and a synchronizer ring provided on one side of the hub. An annular cover plate has axially projected projections and an axially projected lug. The cover plate is secured to the hub at the other side, engaging the projections with the periphery of the boss and the lug with a hole provided in the boss, thereby preventing the keys from disengaging from the synchronizer.

3 Claims, 6 Drawing Figures

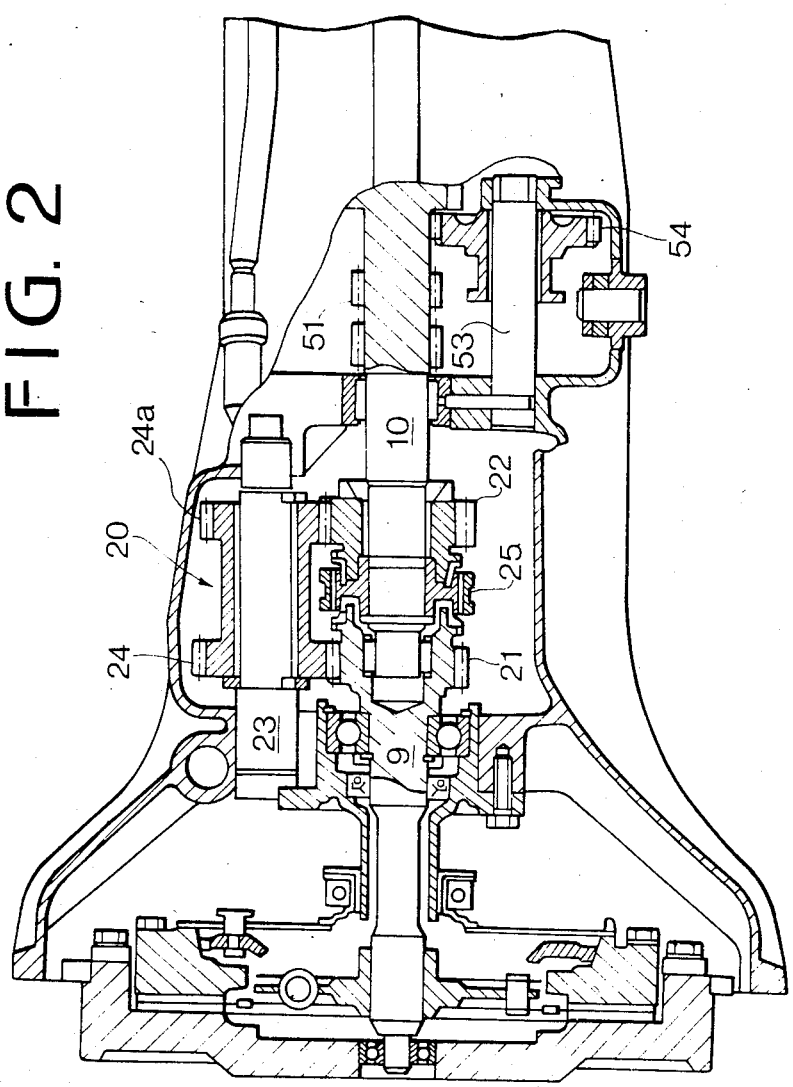

SYNCHRONIZER IN A TRANSMISSION FOR A MOTOR VEHICLE

BACKGROUND OF THE INVENTION

The present invention relates to an apparatus for holding synchronizer keys in a synchronizer provided in a transmission for a motor vehicle, in order to prevent the keys from disengaging from the synchronizer.

In a change-speed power transmission having odd speeds, one of synchronizers must be provided for only one speed gear. Accordingly, no synchronizer ring and gears are provided on one of sides of the synchronizer to form an inoperative side. However, the sleeve of the synchronizer may be shifted to the inoperative side, for example, in order to select a reverse gear. When the sleeve is shifted in the direction, synchronizer keys may disengage from the synchronizer. To eliminate such a failure, a plate is attached to the synchronizer for holding the keys.

Japanese Utility Model Laid Open 57-40729 discloses a device, in which a retainer is secured to a boss formed on a synchronizer hub so as to prevent the disengagement of keys. However, the retainer is complicated in shape and the synchronizer hub must be formed in different shape from the ordinary synchronizer. Further, the retainer must be independently attached irrespective of the assembling of the synchronizer, which means complification of the attachment of the retainer.

SUMMARY OF THE INVENTION

An object of the present invention is to provide an apparatus for preventing the disengagement of synchronizer keys, which may be constructed without changing the construction of an ordinary synchronizer.

Another object of the present invention is to provide an apparatus which is simple in construction and assembling.

In accordance with the invention, a synchronizer has an annular cover plate having a central hole, axially projected projections provided at an outer portion adjacent the periphery thereof, and an axially projected lug. The cover plate is secured to a hub of the synchronizer at the inoperative side, engaging the projections on the periphery of a boss of the hub and the lug with a hole formed in the boss. In an aspect of the present invention, each of the projections is located at a position adjacent to a diametrically inner side of a corresponding key.

The other objects and features of this invention will be apparently understood from the following description with reference to the accompanying drawings.

BRIEF DESCRIPTION OF DRAWINGS

FIG. 2 is a horizontal sectional view of a part of the transmission of FIG. 1a;

DETAILED DESCRIPTION OF THE PREFERRED EMBODIMENT

Figure 1A:
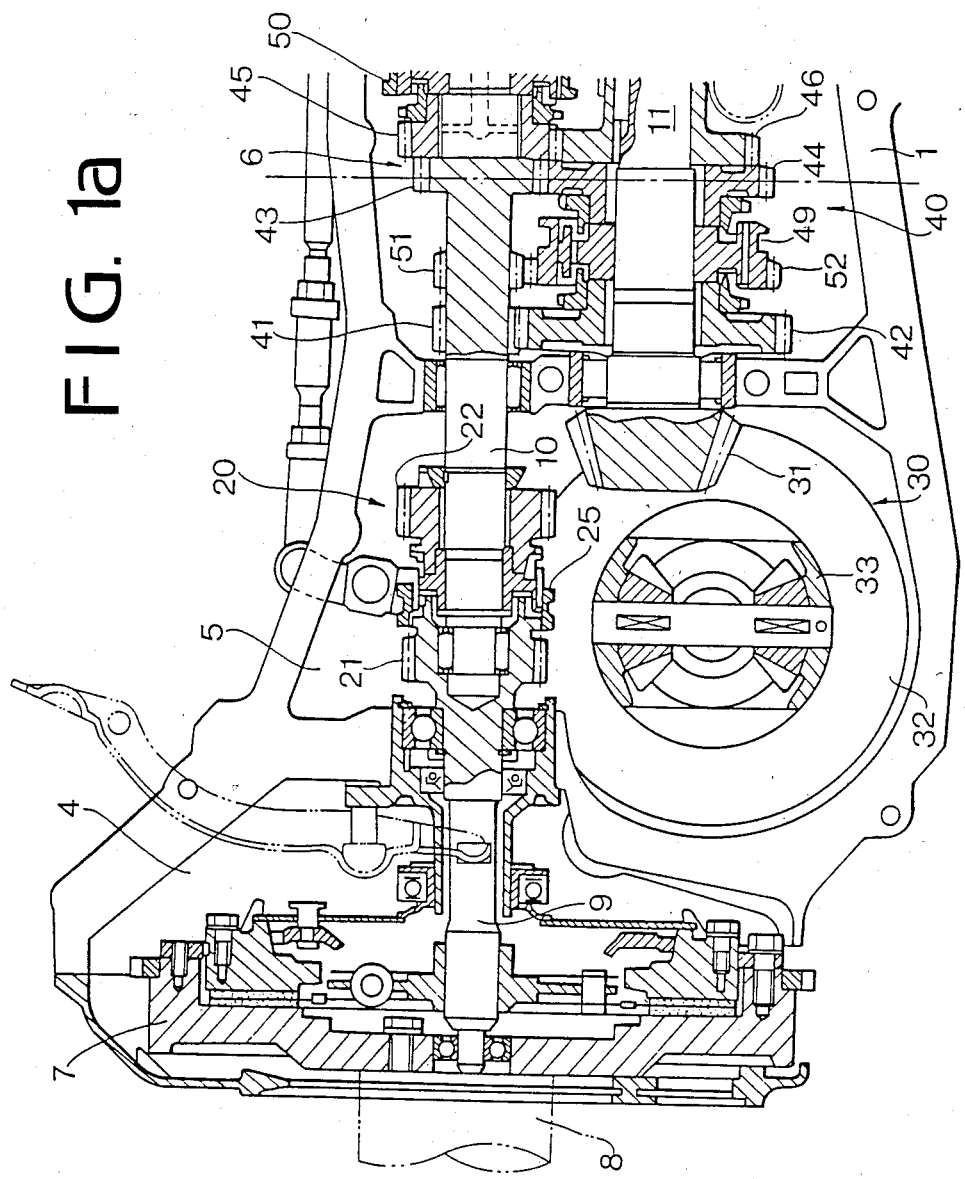
FIG. 1a and 1b are a longitudinal sectional view showing a transmission for a four-wheel drive motor vehicle, to which the present invention is applied.
Figure 1B:
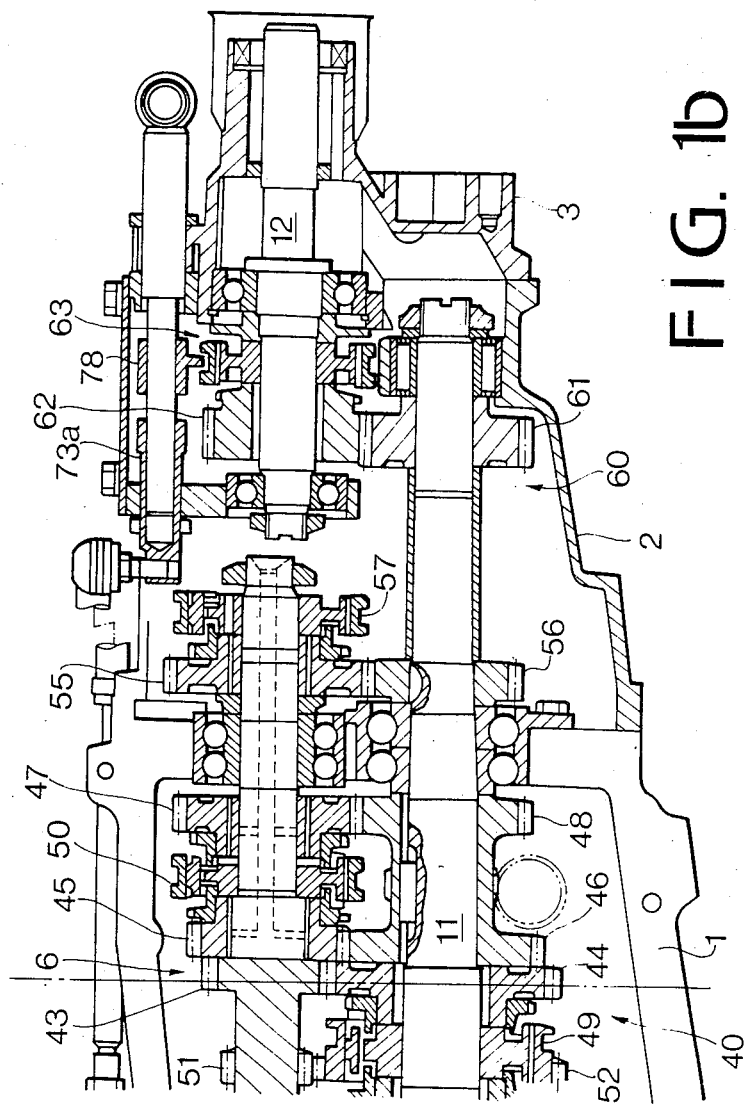

Referring now to the drawings, and more particularly to FIGS. 1 and 2, there is illustrated a longitudinally disposed trans-axle type transmission for a four-wheel drive motor. The transmission comprises a transmission case 1, a transfer case 2 secured to the case 1 at the rear end thereof, and an extention case 3 secured to the case 2. The transmission case 1 comprises a pair of longitudinally divided shells and the inside thereof is divided to three compartments 4 to 6. A clutch 7 is provided in the forward compartment 4, and a sub-transmission 20 and a front differential 30 are arranged in the middle compartment 5. A main transmission 40 is provided in the compartment 6 and case 2, and a transfer device 60 is disposed in the case 2. In the driving system, a crank shaft 8 of an engine (not shown) is operatively connected to an end of an input shaft 9 through the clutch 7 and the sub-transmission 20 is disposed between the input shaft 9 and a main drive shaft 10 of the main transmission 40.

The sub-transmission 20 comprises a high speed gear 21 having a low gear ratio formed on the input shaft 9, a low speed gear 22 having a high gear ratio rotatably mounted on the main drive shaft 10 in alignment with the shaft 9, a counter gears 24 and 24a (FIG. 2) rotatably mounted on a counter shaft 23, and engaged with both gears 21 and 22, and a synchronizer 25 as a clutch disposed between the high speed gear 21 and the low speed gear 22 on the main drive shaft 10. As shown in FIG. 1, when the synchronizer 25 is engaged with the high speed gear 21, the shaft 9 is directly coupled to the shaft 10 to provide a higher speed drive range, and, on the contrary, when the synchronizer is engaged with the low speed gear 22, the gear 21 is connected to the shaft 10 through gears 24, 24a and 22 to provide a lower speed drive range. The main transmission 40 is a five-speed transmission with overdrive, in which an output shaft 11 is arranged below the drive shaft 10 in parallel with it. First gear 41 and 42, second gears 43 and 44, third gears 45 and 46, and fourth gears 47 and 48 are provided on both shafts 10 and 11. The first and second driven gears 42 and 44 are rotatably mounted on the output shaft 11 and a synchronizer 49a is disposed between the driven gears. The third and fourth drive gears 45 and 47 rotatably mounted on the main drive shaft 10 and a synchronizer 50 is disposed between the drive gears. For reverse driving, an idler gear 54 is slidably mounted on a shaft 53 as shown in FIG. 2, and adapted to be engaged with a drive gear 51 on the drive shaft 10 and with a driven gear 52 on the sleeve of the synchronizer 49a. In addition, the main transmission has fifth speed gears 55 and 56 between the main drive shaft 10 and the output shaft 11, and a synchronizer 49b arranged between the rotatable drive gear 55 and the shaft 10. A drive pinion 31 is formed at the front end of the shaft 11 and engaged with a crown gear 32 of a front differential 30, and a differential gear device 33 of the front differential 30 is coupled to front wheels.

In the transfer device 60, a transfer drive gear 61 securely mounted on the output shaft 11 is engaged with a driven gear 62 rotatably mounted on a rear drive shaft 12 and a transfer clutch 63 in the form of a synchronizer 57 is disposed between the gear 62 and the shaft 12.

Figure 3:
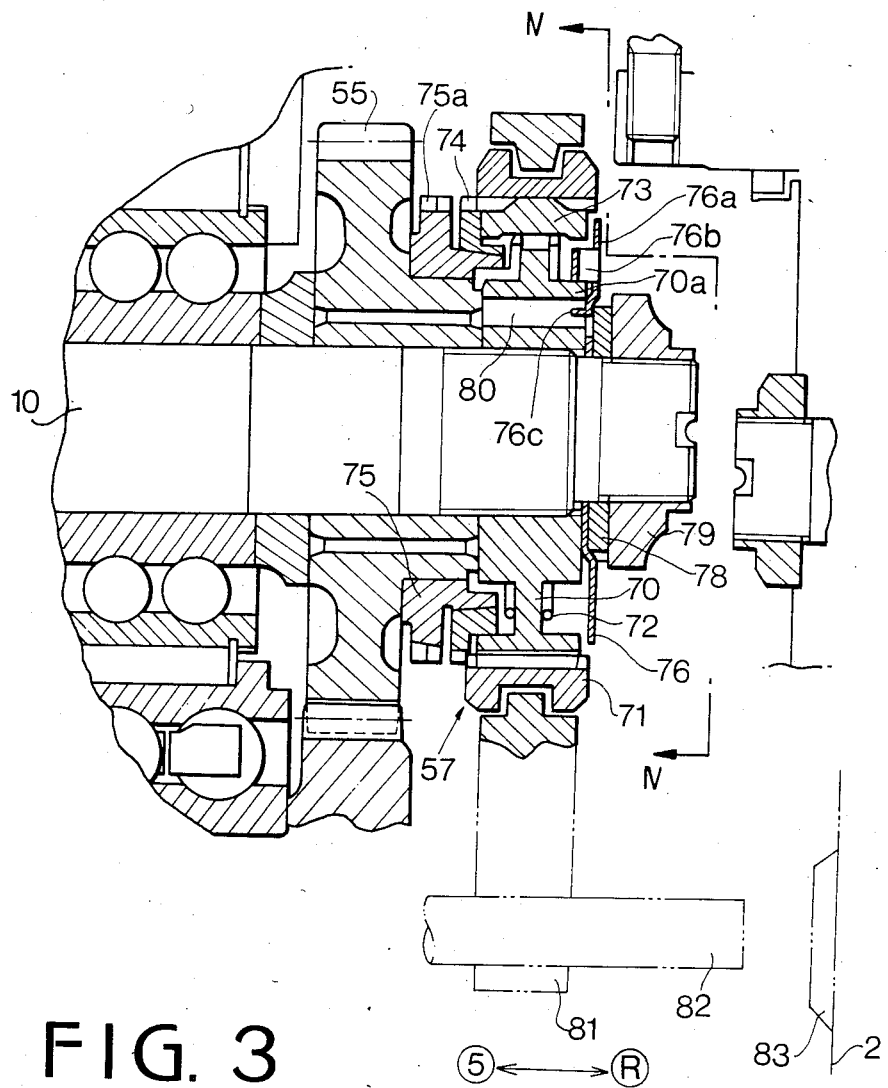
FIG. 3 is a sectional view of an embodiment of the present invention.
Figure 4:
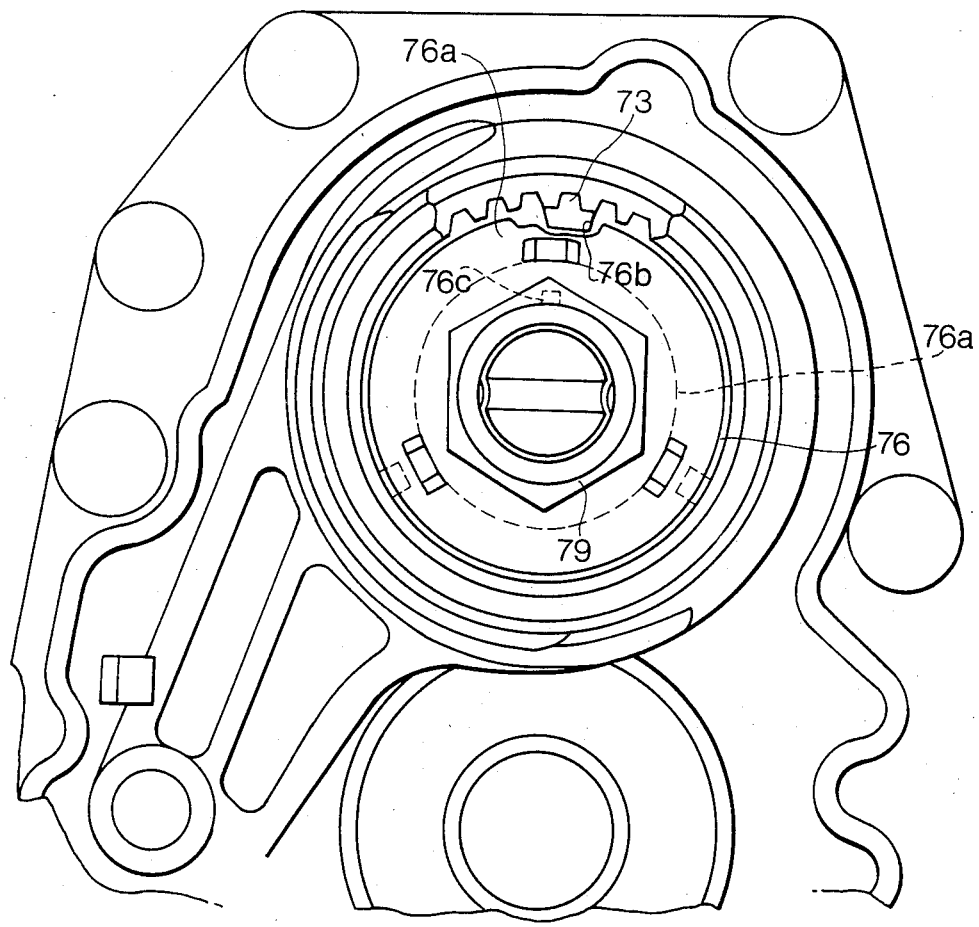
FIG. 4 is a side view as viewed from arrows IV—IV of FIG. 3.

Referring to FIG. 3, the synchronizer 57 comprises a synchronizer hub 70 having a boss 70a at a central portion thereof and secured to the main drive shaft 10 with splines, a sleeve 71 axially slidably engaged with the hub 70 with splines, and three synchronizer keys 73 provided between the hub and the sleeve. Each key 73 is engaged with a groove 70b provided on the hub and urged to the sleeve 71 by springs 72. A synchronizer ring 74 is provided between the sleeve 71 and a cone 75 having splines 75a and secured to the fifth-speed gear 55. On the inoperative side of the synchronizer 57, where no synchronize ring and speed gear are provided, a cover plate 76 is provided.

Figure 5:
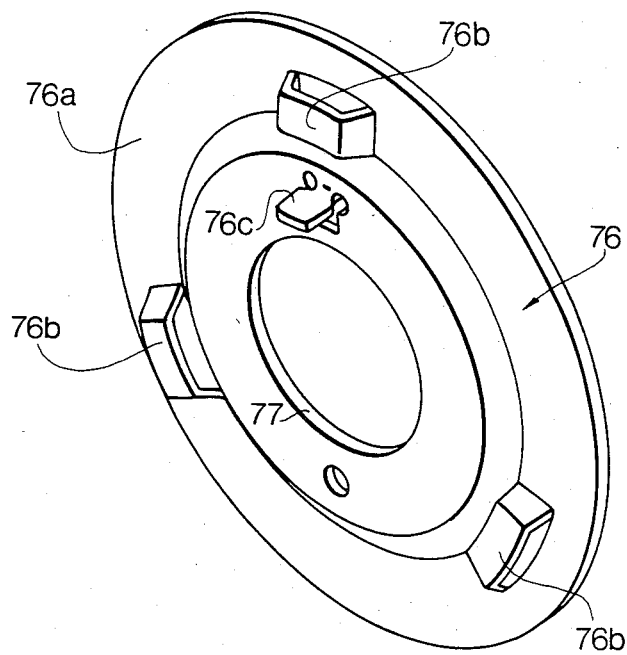
FIG. 5. is perspective view showing a cover plate.

As shown in FIG. 5, the cover plate 76 is an annular plate having a central hole 77, three projections 76b, on an outer portion 76a adjacent to the periphery, corresponding to three keys 73. Each projection 76b is axially projected towards the hub 70 and positioned adjacent to the corresponding key at the diametrically inner side, and mounted on a periphery of boss 70a of the hub 70. Further, the cover plate 76 has a lug 76c axially projecting towards the hub 70, and is engaged with a hole 80 formed in the boss 70a of hub 70. Those projections and lug are formed by press working. The cover plate 76 is secured to the outer side of the boss 70a by a lock nut 79, interposing a washer 78. The cover plate 76 is diametrically located by the engagement of projections 76b with the periphery of the boss 70a and at a circumferentially positioned by engaging the lug 76c with the hole 80. The peripheral portion 76a is positioned adjacent to the outside of each key 73 and each projection 76b is positioned adjacent to the diametrically inner side of the key, thereby preventing keys from outwardly moving.

A fork 81 secured to a shifter rail 82 is engaged with a peripheral groove of the sleeve 71. When the shifter rail 82 is shifted to the left (FIG. 3) by operating a gear shift lever (not shown), the sleeve 71 is shifted to the left, so that interal teeth of the sleeve engage with external teeth of synchronizer ring 74 and splines 75a. Thus, the fifth speed gear 55 is operatively coupled to the main drive shaft 10. When the shifter rail 82 is shifted to the right (reverse gear selection), the sleeve 71 is shifted to the right. However, keys 73 are prevented from moving in the axial direction and radial direction by the peripheral portion 76a and projections 76b. On the other hand, the shifter rail 82 is stopped by a stopper 83 provided in the case 2, thereby to prevent the sleeve 71 from disengaging from the hub 70.

In accordance with the present invention, the cover plate is positioned on the hub of the synchronizer by the engagement of projections provided thereon with the periphery of the boss of the hub, thereby preventing the disengagement of synchronzier keys, and the cover plate can be located at an exact position by the engagement of the projections. It will be understood that the synchronizer can be used without changing the construction, except forming the hole in the hub.

While the presently referred embodiment of the present invention has been shown and described, it is to be understood that this disclosure is for the purpose of illustration and that various changes and modifications may be made without departing from the scope of the invention as set forth in the appended claim.

What is claimed is:

1. A synchronizer in a transmission for a motor vehicle, the synchronizer having a hub having a boss at a central portion thereof and secured to a shaft of the transmission, a sleeve axially slidably engaged with the hub with splines, synchronizer keys provided between the hub and the sleeve, and a synchronizer ring provided on one side of the hub, comprising;

the hub having a hole at the other side of thereof;

an annular cover plate having a central hole, axially projected projections provided at an outer portion adjacent the periphery thereof, and an axially projected lug;

the cover plate being secured to the hub at the other side by a nut engaged with the shaft, engaging the projections with the periphery of the boss and the lug with the hole of the hub, and locating the outer portion adjacent to the synchronizer keys.

2. The synchronizer in accordance with claim 1 wherein each of the projections corresponds to one of synchronizer keys.

3. The synchronizer in accordance with claim 2 wherein each of the projections is located at a position adjacent to a diametrically inner side of the corresponding key.

* * * * *